US011351615B2

(12) United States Patent
Miller

(10) Patent No.: US 11,351,615 B2
(45) Date of Patent: Jun. 7, 2022

(54) STEPPED DRILL BIT WITH ALTERNATELY SHARPENED EDGES TO CLEAN-OUT OBSCURED FASTENER OPENINGS IN CROSS LAMINATED TIMBER JOINTS

(71) Applicant: Miller Dowel Company, Wilmette, IL (US)

(72) Inventor: Michael R. Miller, Wilmette, IL (US)

(73) Assignee: The Miller Dowel Company, Wilmette, IL (US)

( * ) Notice: Subject to any disclaimer, the term of this patent is extended or adjusted under 35 U.S.C. 154(b) by 125 days.

(21) Appl. No.: 16/838,333

(22) Filed: Apr. 2, 2020

(65) Prior Publication Data

US 2020/0316694 A1 Oct. 8, 2020

Related U.S. Application Data

(60) Provisional application No. 62/829,433, filed on Apr. 4, 2019.

(51) Int. Cl.
*B23B 51/00* (2006.01)
(52) U.S. Cl.
CPC .................................. *B23B 51/009* (2013.01)

(58) Field of Classification Search
CPC ... B23B 51/009; B23B 51/104; B23B 49/005; B23B 2260/0482; B23B 2260/12; B23B 2251/14; B23B 51/02; B27G 15/00
See application file for complete search history.

(56) References Cited

U.S. PATENT DOCUMENTS

| | | | | |
|---|---|---|---|---|
| 2,732,869 A | * | 1/1956 | Stearns | ................... B27G 15/00 408/224 |
| 2,832,386 A | * | 4/1958 | Van Dalen | ............ B23B 51/104 408/193 |
| 2,897,695 A | * | 8/1959 | Winslow | ............... B23B 51/108 408/224 |
| 5,915,893 A | * | 6/1999 | Miyanaga | ............. B23B 51/009 408/202 |

* cited by examiner

*Primary Examiner* — Eric A. Gates
*Assistant Examiner* — Paul M Janeski
(74) *Attorney, Agent, or Firm* — Dennemeyer & Associates, LLC.

(57) ABSTRACT

A drill bit for use with construction using cross laminated timbers (CLT) is provided. The bit has both sharpened and dull portions of the cutting element of the bit, so that it can clean-out an opening in the CLT that has been partially obscured by shifts in the laminated constituents of the CLT, without elongating or otherwise changing the shape of the fastener opening. The use of the bit is made at the construction site in fastener openings previously made and otherwise obscured, thereby allowing the quick assembly and construction of a structure made of CLT.

15 Claims, 6 Drawing Sheets

STEPPED DRILL BIT WITH ALTERNATELY SHARPENED EDGES TO CLEAN-OUT OBSCURED FASTENER OPENINGS IN CROSS LAMINATED TIMBER JOINTS

FIELD OF THE INVENTION

The present invention concerns the field of Cross Laminated Timber (CLT) construction, dowels used as fasteners and on-sight preparation for the joinder of construction elements. More particularly the present invention concerns a drill bit used to sort-out the premade openings into which dowels for joining two construction elements are driven. The drill bit is employed so that, in the event that the constituents of the construction elements have slipped since fastener openings were created, those opening can be sorted to permit the dowel, or fastener, to be nominally inserted therein to complete the construction process.

BACKGROUND OF THE INVENTION

Construction of large elements, using cross laminated timbers (CLT) is a relatively new field when it comes to the use of such materials to create large structures. The use of CLT construction is moving forward in places where the use of sustainable materials and contemporary design are important. The materials have been found to be as strong and durable as standard construction materials, such as steel and concrete; but new methods of fastening the construction elements have become necessary as a result of the science of sustainable materials and the problems associated with the use of standard fasteners with these specialized materials.

CLT elements are wood panel product made from gluing layers of solid-sawn lumber together. Each layer of boards is oriented perpendicular to adjacent layers and glued on the wide faces of each board, usually in a symmetric way so that the outer layers have the same orientation. In the past, when such elements were used as decorative parts of interiors or parts of artistic elements of buildings, fastening of parts could include nailing elements together or drilling of holes through elements with the use of traditional fasteners, such as bolts, tying the CLT members together with washers and nuts. Today however, wood elements of the type described are being used as external structural members of even large towers and buildings.

As will be understood, the use of metal in association with wood products can be a successful exercise when the metal elements are not exposed to nature, such as in art work within a housing. Metal exposed to external forces can oxidize, changing size and shape and causing damage to the wood fibers. Further, tying CLT with such standard fasteners which tend to squeeze the wood elements together, by the force of tightening the fastener, can cause the surface wood fibers to be damaged.

In order to alleviate these destructive conditions, CLT construction has taken to pre-drill openings, for wood dowels, into the panels as the panels are constructed and identified for location in the plans of the structure. In the same manner that steel elements for use in the construction of buildings or bridges are often marked as to the their placement in structure with opening for fasteners pre-made, CLT construction now includes the creation of openings to facilitate the construction using dowels placed so that two or more elements can be joined together at the construction site. Panels for construction are created in a factory and referenced for specific locations in the building to which they will be formed. As the pieces are finished, the openings are created therein.

Unfortunately, it has been found that the holes thus made, which comprise stepped sections wherein each step is generally concentrically oriented about a single axis there through, by the time the panel is delivered to the construction site, have been partially blocked or obscured due to the shifting of the constituent wood pieces used in the construction of a CLT panel. It can be seen in such panels that there no longer exists a single axis with all elements concentric thereto, through the length of the opening thus impeding the easy placement of a dowel therein. While in most cases the shifting is slight, it has been found that the shifting is generally sufficient to cause the need for extra force to drive the dowel and often, with stepped dowels, one or more of the steps can no longer be well filled by the dowel. If a dowel cannot be driven sufficiently into a hole, the user may cut the part extending from the surface off, so that it is flush with the surface, without realizing that the dowel element that usually fits at the bottom of the opening is equally elevated and the opening is not filled or well filled. This will result in a weakened connection that can prove fatal to the strength of the structure.

It is therefore an object of the present invention to provide a means for cleaning up the pre-drilled holes in a CLT panel at the site of construction, without making the openings any deeper than specified by the designer or engineer but instead making each section again generally concentric about a single axis there through, prior to the insertion of the dowel and thereby allowing the dowel, when set, to properly fasten the elements of the structure.

Other objects and advantages of the present invention will become apparent as the description proceeds.

SUMMARY OF THE INVENTION

In accordance with the present invention, a drill bit having one or more sections, including stepped sections, is provided for the specific task of cleaning up the openings in a wood panel, without enlarging the opening in the direction of the long axis of the bit. The bit is designed with cutting edges and flutes to allow material to be shaved from the walls of the opening so that the opening is true to the shape of a dowel to be inserted therein. The use of the bit is made in every hole of the structural elements just prior to the joinder of that element to other elements of the structure, with the opening in the other elements to be fastened together being identically cleaned just prior to joinder. Once cleaned-up the dowel assigned to the opening can be coated with an adhesive, the elements to be joined together can be put into proximity with each other, and the dowel can then be more easily driven through one element of the structure into its adjoining element thereby joining those elements together.

In another embodiment, the dowel can be used as a biscuit such that the openings in the elements are only through one part of the panel, the dowel is inserted into one panel, after the opening is cleaned-up by the bit of the present invention, the opening of the other panel is likewise cleaned-up and the elements are pressed together until the dowel adheres to both elements. It will be understood that in some instances a pressed fit of the dowel within the opening is sufficient to hold the panels together, in a preferred embodiment, the dowel will be used concomitantly with an adhesive which will tend to cause the dowel and panel to act as an homogenous element; the two panels joined together to act accordingly.

More specifically, a drill bit, for cleaning out an opening previously made which has become distorted in cross laminated timbers, (CLT), is provided, the bit comprising one or more cutting edges placed axially along the bit and designed to cut material and one or more flutes designed to force the material cut by the bit out of the opening. The proximal-most of the one or more cutting edges of the bit has a first portion sharpened to properly shape the interior walls of the opening previously made and presently distorted, and has an unsharpened portion to stop the axial movement of the bit when a barrier to the blade is reached.

In some embodiments, the sharpened first portion of the cutting edge of the drill bit comprises 50% of the cutting edge. But it will be understood that the sharpened first portion of the cutting edge can comprises between 20% and 50% or more of the cutting edge; generally sharpened on the outer edge of the blade. Further, the drill bit in some embodiments comprises between 2 and 3 stepped portions can have between 2 and 4 stepped portions or in fact any number of stepped potions.

So as to function to remove only that amount of material necessary for the hole to fit a fastener and in the situation of a three stepped opening, the cutting edges of the bit are sharp in only the first and second most proximal stepped portions. But it will be understood that the drill bit will have sharpened portions of the blades so as to extend only to a depth equal to those sections of the opening having distortions.

In a preferred embodiment, the barrier for stopping the blade's progress within the hole is a shoulder of stepped portion of the opening to be cleaned.

In another embodiment a multi-step drill bit, for cleaning out a multi-step opening, comprising generally concentric portions along an axis, previously made in a cross laminated timber, (CLT) and then distorted, is provided, the drill bit comprising a blade, placed axially along the bit at the proximal most step of the bit, designed to cut material and one or more flutes to force the material cut by the bit out of the opening. The blades of the bit being conically shaped so that the cone is larger towards the proximal side of the bit and narrows towards the distal end of the bit and the blade being sharp at the large part of the cone and dulled at the narrow part of the cone so that the blade of the bit properly shapes the interior walls of the opening previously made and is caused to stop when the dull part of the blade reaches the shoulder of the first step.

A more detailed explanation of the invention is provided in the following description and claims and is illustrated in the accompanying drawings.

DETAILED DESCRIPTION OF THE ILLUSTRATIVE EMBODIMENT

Figure 1:
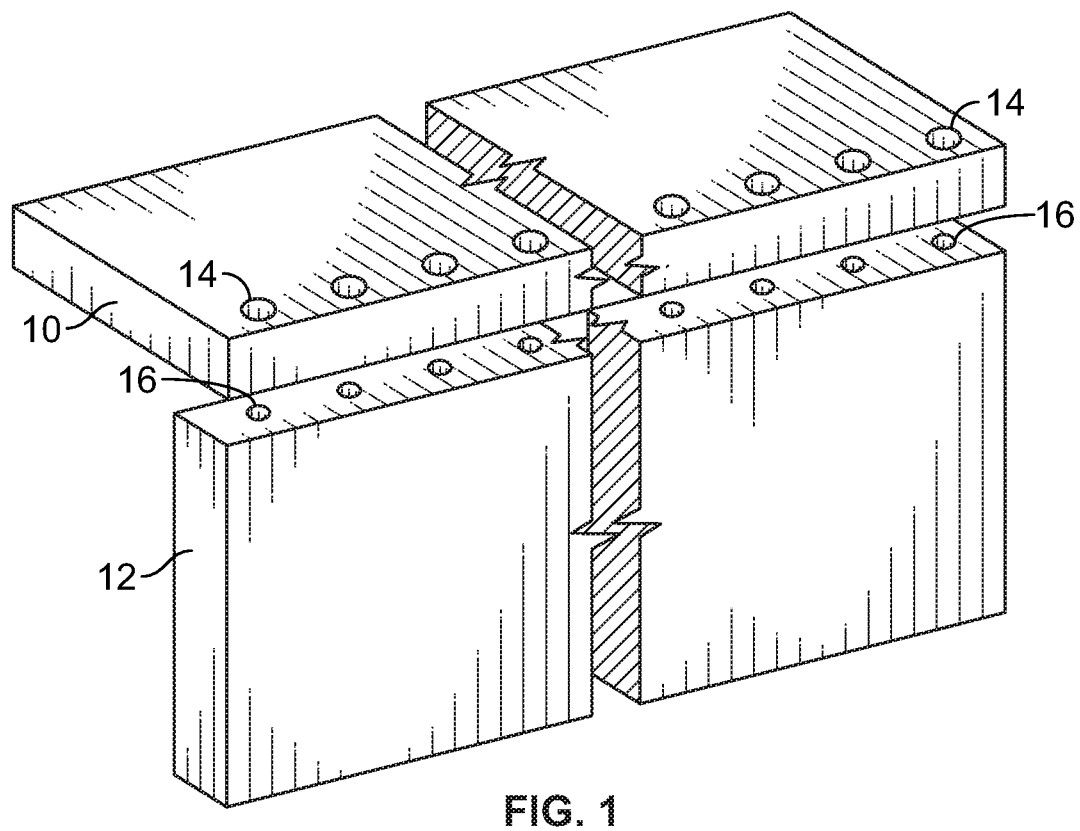
FIG. 1 is a perspective view of elements of wood, of variable lengths, with openings made therein in preparation for joinder.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

Figure 2:
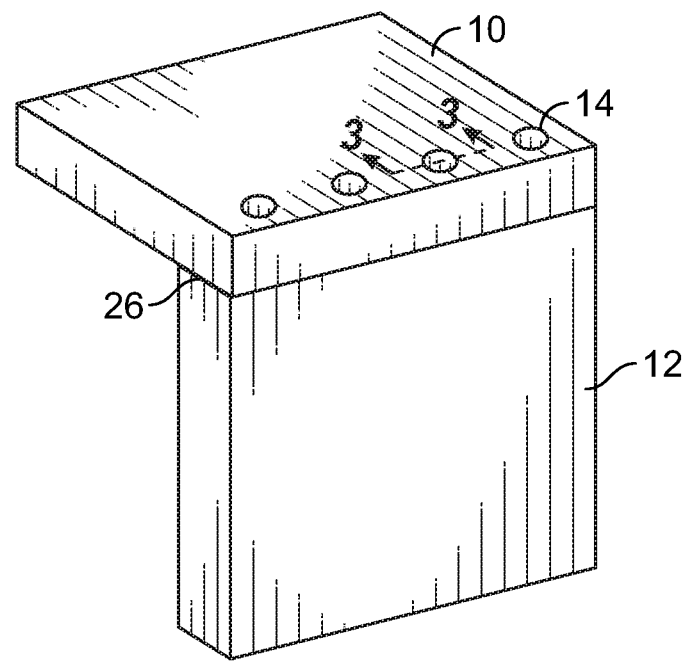
FIG. 2 is a representation of the elements of wood of FIG. 1, in place for fastening.
Figure 3:
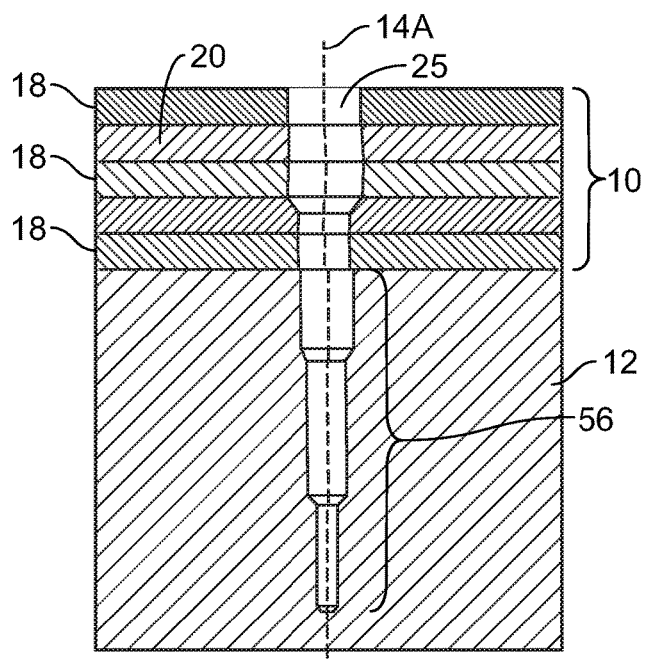
FIG. 3 is a cross-sectional view of the elements of FIG. 2, made along the line 3-3 of FIG. 2.
Figure 12:
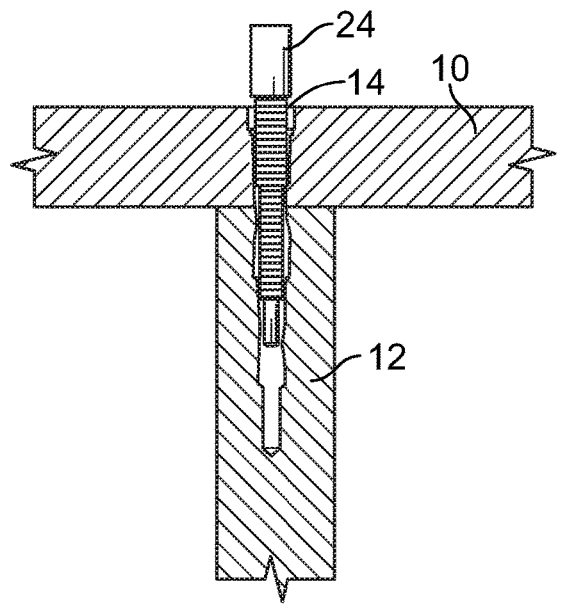
FIG. 12 is a cross-sectional view of adjoining wood elements showing the attempted insertion of a dowel prior to the use of the drill bit of the present invention.
Figure 15:
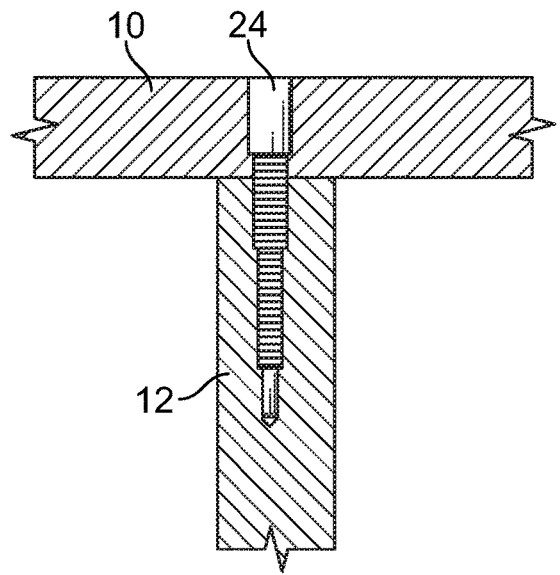
FIG. 15 is a cross-sectional view of adjoining wood elements after the use of the drill bit of the present invention with the dowel inserted therein.

Referring to the drawings, FIGS. 1 and 2 show one type of joinder of two wood panels that is subject to the use of the drill bit of the present invention. Element 10 and element 12 are to be joined together at approximately a right angle, using fastener openings 14 in element 10 and fastener opening 16 in element 12, which are aligned together before a fastener, such as a dowel, is pressed therein to join the elements together. In a preferred embodiment of the present invention (most clearly shown in FIGS. 12 and 15), the fastener used is a stepped wood fastener, meaning that along the major axis of the fastener there are segments of increasingly smaller circumference from the proximal end of the fastener to its distal end. FIG. 3 shows a cross-section of the connection, taken from the line 3-3 of FIG. 2. In the cross-section, it can be seen that the wood elements, 10 and 12, are created using layers of wood 18 that are laminated together with their respective wood grains 20 being in perpendicular configuration, layer by layer, to create the Cross Laminated Timber (CLT) wood elements. In FIGS. 1, 2 and 3 the openings in the wood elements 10, 12 are shown—and it is clear, from FIG. 3, that the type of fastener to be used to hold the two elements 10, 12 together is a stepped-fastener; that is the fastener provides sections of different diameters along the same axis. The preferred fastener in the assembly of CLT structures is a wood dowel 24, as shown in FIGS. 12 and 15 and in cross-section in FIGS. 6A and 6B. In the present situation, the smaller diameter opening 16 is at the distal end and the larger opening 14 is at the proximal end to thereby allow the stepped-fastener to be placed in the opening.

In the creation of CLT panels 10, 12 for construction, it is typical that the fastener openings 14, 16 will be created at the point of manufacture and the wood element 10, 12 will be shipped to the site ready for assembly and identified as to exact position in the construction plan. It will be understood that as the desired fastener is a stepped fastener, providing greater strength at its wide diameters as needed, the hole or opening made to cooperate with such a fastener must also have steps and that when the fastener is placed within the opening each step of the fastener is met with a corresponding step of the opening. In a rudimentary lock and key situation. This is clearly illustrated in both FIGS. 3 and 4 and FIGS. 12 through 15. FIGS. 5*a* and 5B are illustrative of a joinder of elements 10 and 12 prior to the entry of a fastener in hole 25. FIGS. 5A and 5*b* are illustrative of the idealized opening 25, as the opening 25 appears in the factory prior to shipment; all of the layers 18 are shown, with the openings there though perfectly aligned.

Figure 6A:
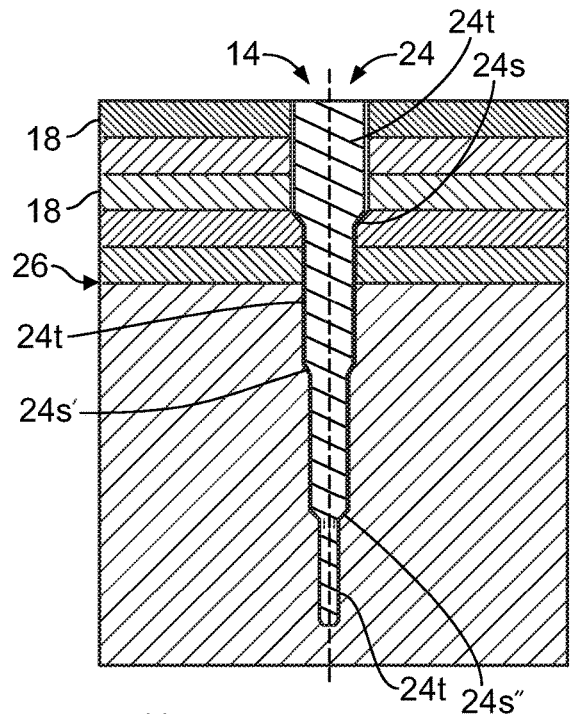
FIGS. 6A and 6B are depictions of a dowel in place in the factory made opening in different kinds of wood.
Figure 6B:
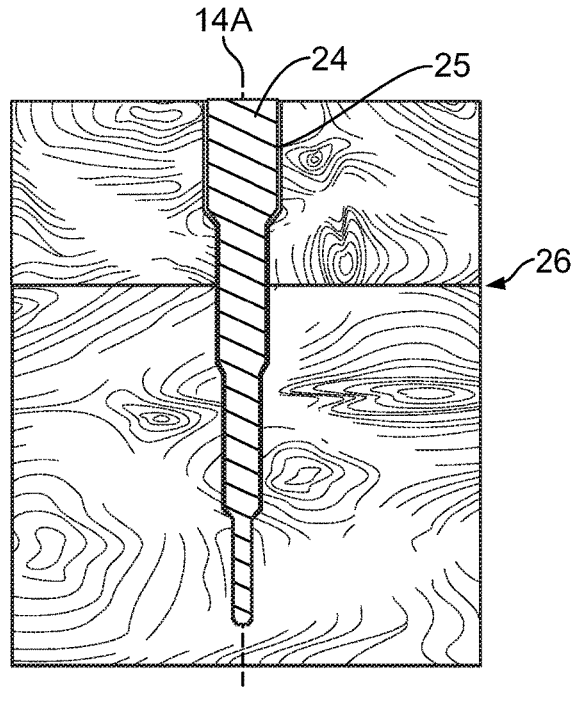

As shown in FIG. 6A, the position of the fastener opening 14 must be made in a precise fashion such that the shoulder 24*s* and shaft 24*t* of each layer of the fastener is placed to provide the greatest strength to the connection made with the cooperative elements of the wood; in FIG. 6A, it is seen that the most proximal shoulder 24*s* of the fastener is located well into the central part of the constituent layers, the next shoulder distal 24*s'*, is set into the second wood element 12 with a solid portion or shaft 24*t* of the fastener spanning the actual connection 26 of the two wood elements 10, 12 to provide an uninterrupted span of fastener thereto. It has been found that, with this system of creation and pre-preparation of fastener openings, that with time, movement and changes in ambient conditions, there may be and often is a shift in the laminated layers of the CLT. This then is the issue that the present invention addresses It will be seen, particularly in FIG. 3 (but also in FIG. 12) that the constituent layers of wood 18 in the top element (visible as this cross-section is taken along a plane perpendicular to the planes of the grain of the wood elements; whereas the bottom cross-section is taken through a single layer parallel to the axis of the grain) are prone to shifting between the time the opening 25 is made until the element 10, 12 is delivered to the construction site. It will be noticed that the axis of the opening 14A, shown for each layer is illustrated as a broken and crooked line due to the shifting; causing the cylindrical segments of the opening to no longer be concentric. Because of the shift, the fastener 24 can no longer fit into the opening 14 that was created for it, as shown in FIG. 12.

Figure 4:
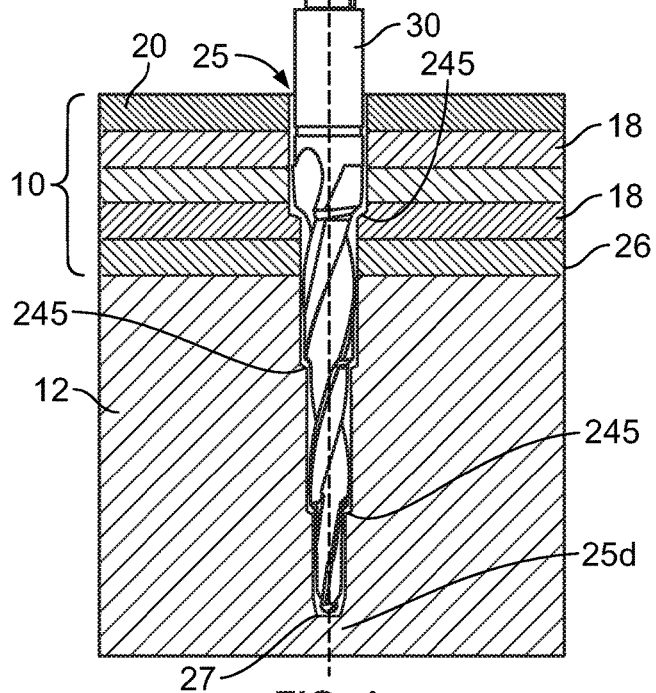
FIG. 4 is the view of FIG. 3 with a drill bit of the present invention within the opening therein.
Figure 5A:
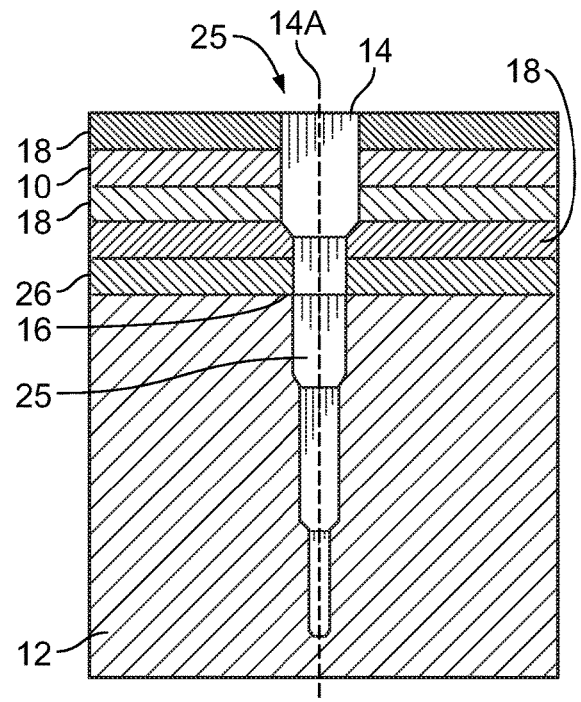
FIGS. 5A and 5B are depictions of a factory made opening in different kinds of wood.
Figure 5B:
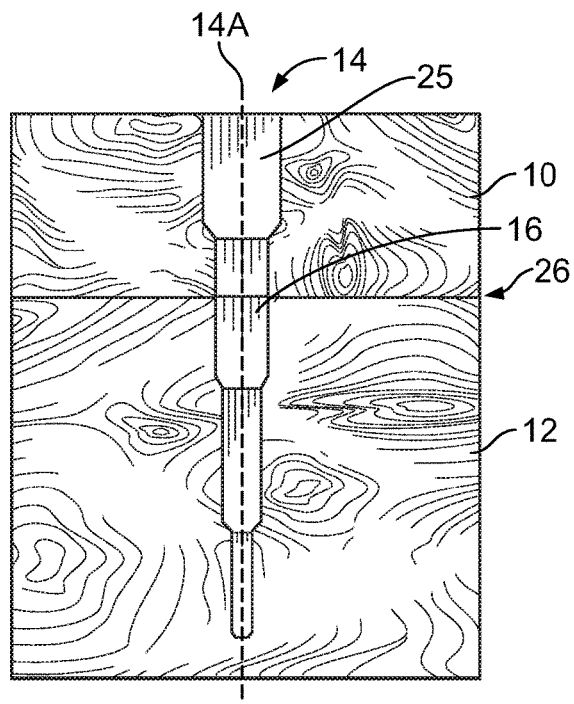

The prior art remedy, used to make the fastener 24 fit within the prior made opening 14, was to clean out the hole 25 using the original drill bit 30 used to create the hole 25, as shown in FIG. 4. However, the use of the original drill bit 30 in this action tended to cause damage to the opening as the precision possible in the factory, in ideal conditions, was not available in the field; and so persons cleaning-out the opening with the original drill bit tended to damage the hole by, among other things, making it deeper 25*d* than the original, including lowering the shoulders 24*s* at each stepped layer and punching deeper into the lowest (or most distal) layer 27. Such action then caused the fastener to be placed deeper into the opening, affecting the strength of the fastener and the joint; changing the engineering to the detriment of the structure. It will be understood, as well, that the use of the original drill bit in the field can be ripe with consequences such as damaging the openings, making them too large and askew, due to the lack of controls available in the factory.

Figure 7A:
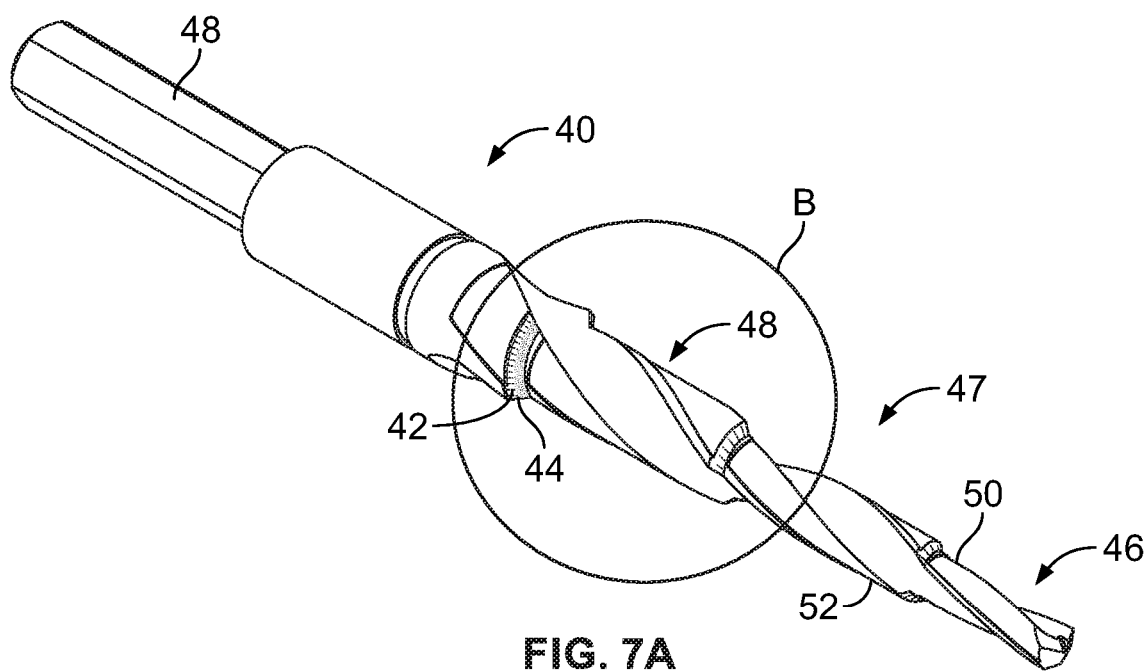
FIG. 7A is a perspective view of a drill bit of the present invention.
Figure 7B:
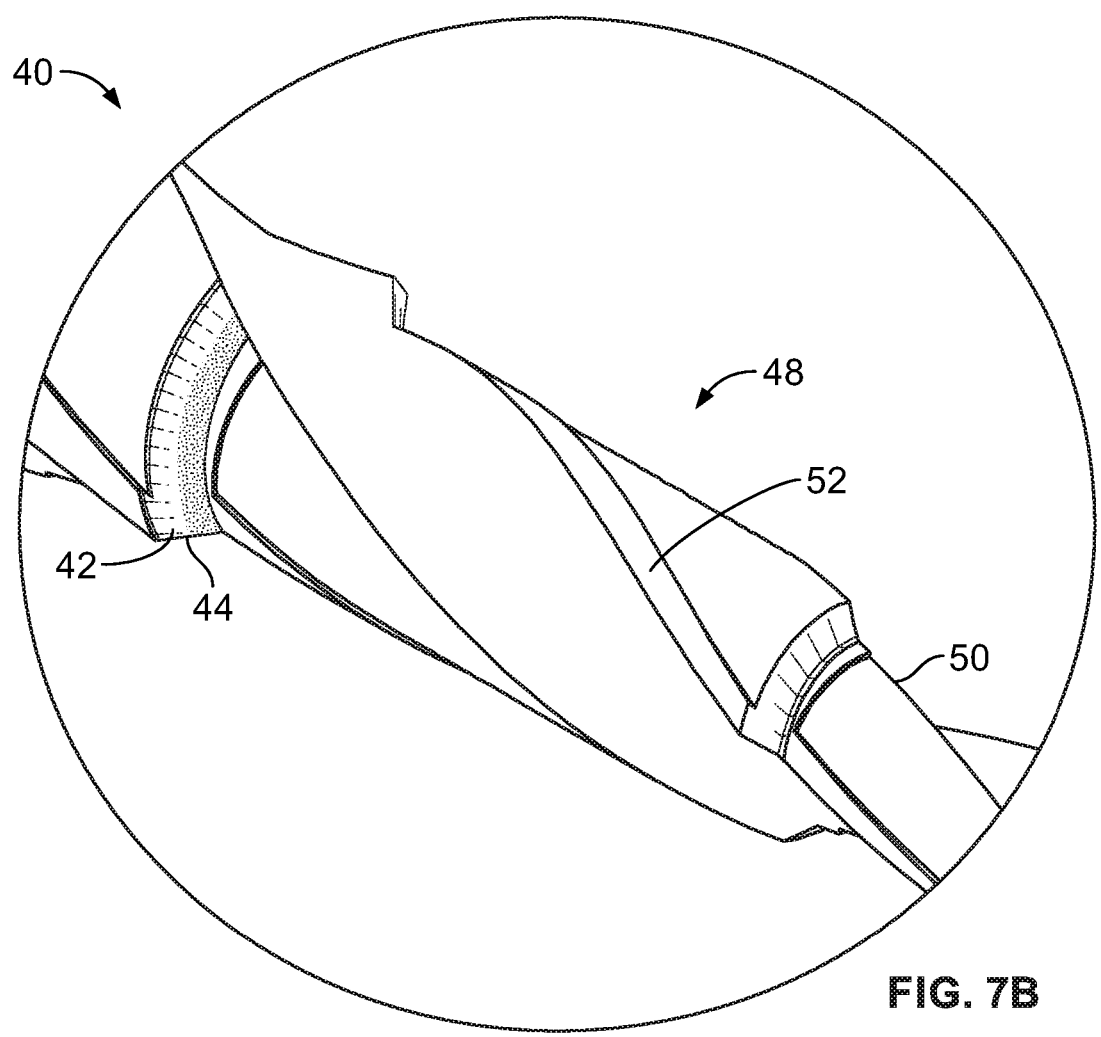
FIG. 7B is a close-up view of section B of FIG. 7A.
Figure 8:
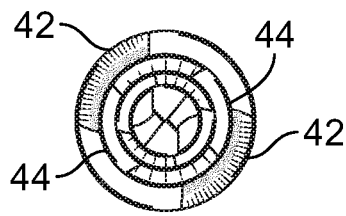
FIG. 8 is a view of the distal end of the drill bit of FIG. 7A.
Figure 9:
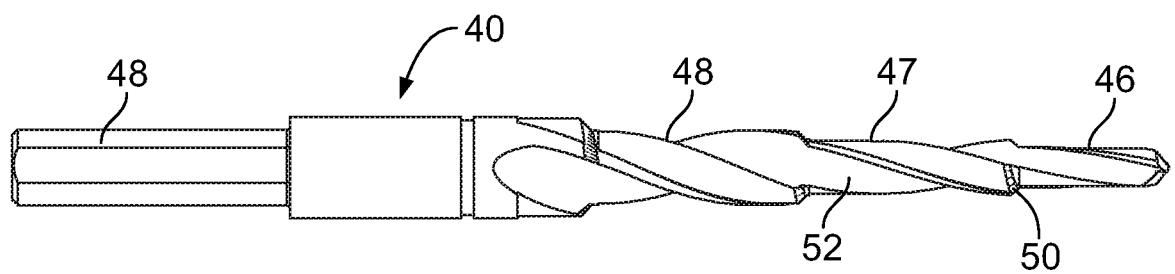
FIG. 9 is a plan view of the drill bit of FIG. 7A.
Figure 10:
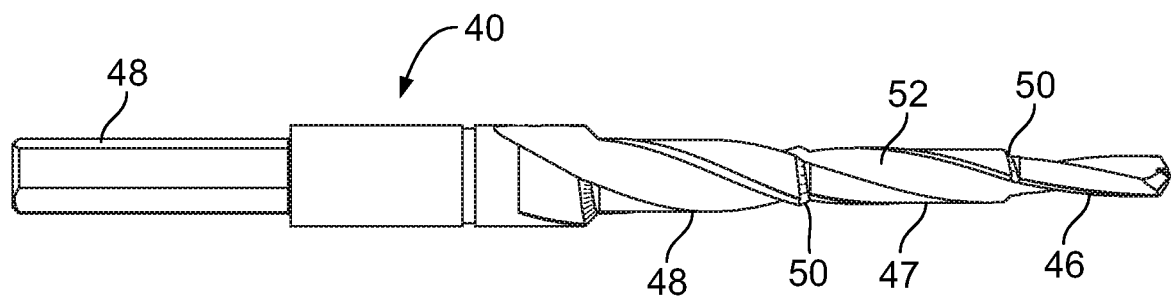
FIG. 10 is an elevational view of the drill bit of FIG. 7A.

The present invention provides a drill bit 40, shown in FIGS. 7A and 7B, that is similar in size and constituency with the original drill bit used to make the hole 25, but has strategically sharp edges 42 and dull edges 44 created on the bit 40 that help to clean out the opening 14 but cannot cut such as to exceed the original parameters of the opening. It will be understood by persons having ordinary skill in the art that a typical drill bit is constructed with sharpened surfaces throughout so as to provide cutting force for the bit; here, it is not desired that the bit cut beyond the original shape of the fastener opening 14 and throughout the depth of the fastener hole 25

Referring now to FIG. 7A, a drill bit 40 of the present invention is shown. It will be seen that the bit 40 comprises stepped drilling sections 46, 47 and 48 so as to be able to make an opening for a stepped fastener 24. The bit 40 illustrated as having cutting edges 50 and flutes 52 to allow the drill bit to cut into wood and to remove cut wood from the opening in a manner well known to persons having ordinary skill in the art. However, in the bit of the present invention, as shown most clearly in FIG. 7B, the cutting edges 50 of the bit 40 are made such that the proximal side of the cutting blade 42 is sharpened and the distal side 44 of the blade is made dull. In a preferred embodiment the sharpened surface is approximately one-half of the blade face with the dull section being the other half of the blade. It will be understood as well that as the cutting surface of the bit comprises a conical section, the sharpened part of the blade 42 will be seen to be that portion most distal from the shaft 48 or axis of the drill bit 40, while the dull edge 44 of the cutting surface is that part of the surface closest to the shaft 48 or axis of the bit 40. The relative location of the sharp and dull elements is important to the understanding of the process as the clean-up in the present invention is directed to the outer circumference of the hole and the dull part of the surface is used, as will be described below, to stop the process at the appropriate moment. Persons with ordinary skill in the art will understand that the percentage of sharp to dull can be varied to achieve desired results without departing from the novel scope of the present invention.

It will also be understood that the shift in the constituent layers 18 of wood only effects that wood element 10 wherein the fastener hole is made perpendicular to the constituent layers 18 of laminated wood and that shifting does not occur, at least to a degree where repair must be made, in the part of the wood element 14 where the bit cuts with the grain of the wood (see, the lower wood element in FIG. 1).

Accordingly, in the creation of the clean-up drill bit of the present invention, sharpened sections of the bit can be made in the most proximal layer of the bit alone, to have full effect to clean out the shifting wood layer occurrence there about, without affecting the lower layers. The remaining blades of the bit 49, in section 46 of bit 40, can be left dull; as can be seen if FIG. 3, those blades would only reach the inner circumference of the fastener opening 25 in places 56 where there has been no shift in the wood and therefore there is no need to clean-out that location.

The use of a blade 50, on the bit 40, sharpened in the manner noted above and in FIGS. 7A and 7B, causes the bit to remove material from the circumference of the opening (that material that has shifted into the opening by the action of the layer shifts) but, because the lower or inner portion 44 is not sharpened, the bit 40 will not cut the shoulder 24*s* any deeper. The dull edge 44 of the bit 40 blade 50 will actual stop the bit 40 when the dull edge 44 strikes the shoulder 24*s*, signifying that the clean-out process is complete.

Figure 11:
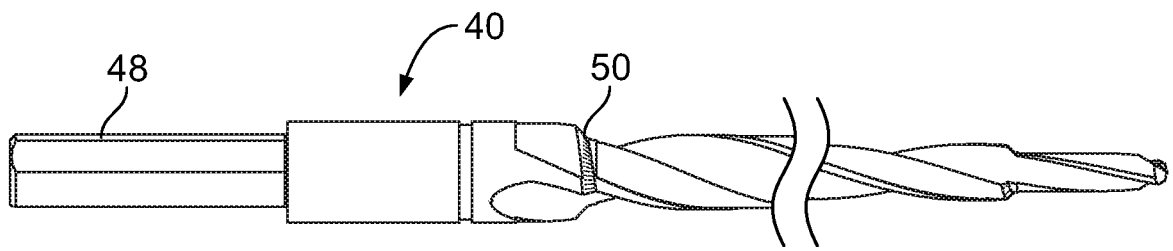
FIG. 11 is an alternative drill bit showing innumerable steps.

It will be understood by persons having ordinary skill in the art that any number of shoulders can be provided (as illustrated in FIG. 11) and that, as needed, the bit of the present invention can have sharpened segments on any of the blades as required by the number of layers and the length of the layered portions of the wood, without departing from the novel scope of the present invention. Elements of the bit 40 are more clearly shown in FIGS. 8 through 11.

FIG. 4 shows the bit 30 of the prior art within the fastener opening 25 and that the axis 14A of the opening is now perfectly straight through the opening 25, the opening has been enlarged, such that a fastener 24 selected for this opening will now tend to be too small for the opening and will lodge too far within the opening, weakening the connection.

Figure 13:
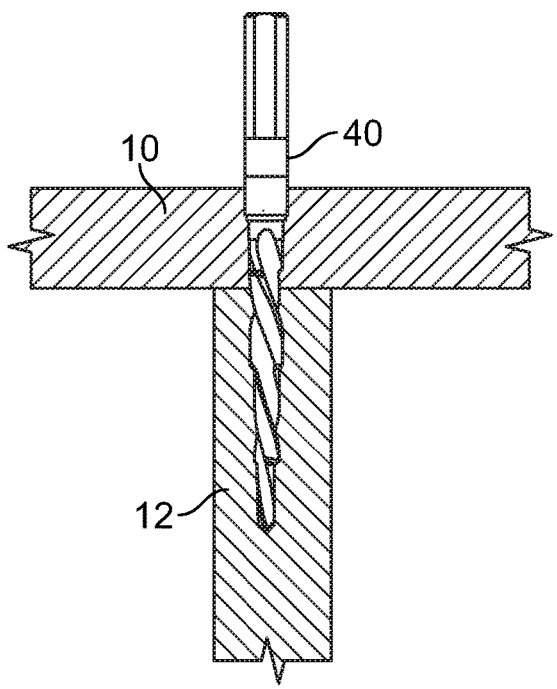
FIG. 13 is a cross-sectional view of adjoining wood elements during the use of the drill bit of the present invention.
Figure 14:
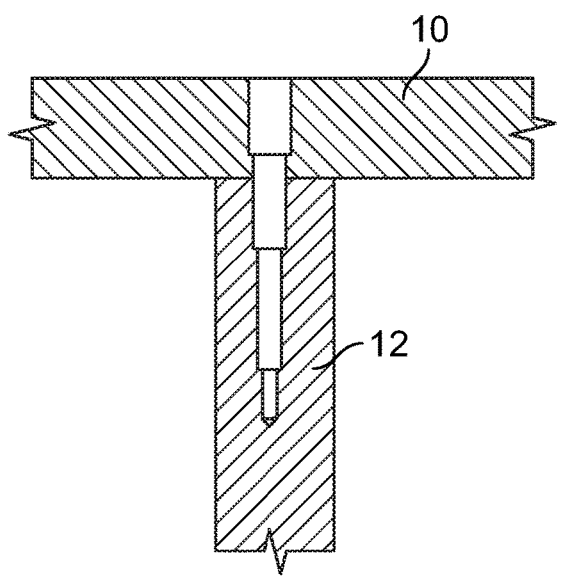
FIG. 14 is a cross sectional view of adjoining wood elements shown after the use of the drill bit of the present invention.

To illustrate the steps to clean out the fastener openings a series of drawings, FIGS. 12 through 15 have been included and show, first that the fastener 24 cannot be put into the desired location of the joinder of two wood elements 10, 12 due to the shifting of the constituent layers which is illustrated by showing that a fastener 24 cannot be properly pushed into opening 14 and that the fastener is jammed at about its half-way point into the opening. In FIG. 13, the bit 30 of the present invention is now used to clean-out the opening. This action is done by using a drill with drill bit 40 therein and running the bit inside of hole 25 until the bit is stopped by operation of the invention. This means that the walls have been cut by blade part 42 of bit 40 and the bit has been operated until such time as blade part 44 is caused to hit a shoulder element within the hole causing the blade to stop. The bit can then be removed from hole 25 which is now shown in better, cleaned out, condition as shown in FIG. 14. The fastener 24 can then be placed as required as shown in FIG. 15.

Although an illustrative embodiment of the invention has been shown and described, it is to be understood that various modifications and substitutions may be made by those skilled in the art without departing from the novel spirit and scope of the invention.

What is claimed is:

1. A multi-stepped section drill bit, for cleaning out an opening previously made, which has become distorted, in cross laminated timbers, (CLT), the bit comprising:
   one or more edges placed axially along the bit and designed to cut wood and one or more flutes designed to force the wood cut by the bit out of the opening;
   the bit having means to be operatively rotated to cut wood, the bit operative to move axially within the opening previously made;
   wherein the proximal-most of the one or more edges of the bit has a first portion, sharpened to cut wood extending into the opening previously made in the CLT, when the bit is placed into the opening previously made in the CLT and operatively rotated; and,
   the bit having at least one unsharpened edge on at least one of the multi-stepped sections to stop the axial movement of the bit when the bit is rotated and moved axially within an opening and the unsharpened edge rotates and eventually strikes the wood.

2. The drill bit of claim 1, wherein a sharpened first portion of one edge comprises 50% of the edge.

3. The drill bit of claim 1, wherein the bit comprises between 2 and 4 stepped portions.

4. A multi-stepped section drill bit, for cleaning out an opening previously made, which has become distorted, in cross laminated timbers, (CLT), the bit comprising:
   a multi-stepped section drill bit, for cleaning out an opening previously made, which has become distorted, in cross laminated timbers, (CLT), the bit comprising:
   one or more edges placed axially along the bit and designed to cut wood and one or more flutes designed to force the wood cut by the bit out of the opening;
   the bit having means to be operatively rotated to cut wood, the bit operative to move axially within the opening previously made;
   wherein the proximal-most of the one or more edges of the bit has a first portion, sharpened to cut wood extending into the opening previously made in the CLT, when the bit is placed into the opening previously made in the CLT and operatively rotated; and,
   the bit having at least one unsharpened edge on at least one of the multi-stepped sections to stop the axial movement of the bit when the bit is rotated and moved axially within an opening and the unsharpened edge rotates and eventually strikes the wood; and,
   wherein a sharpened first portion of one edge comprises between 20% and 50% of the edge.

5. A multi-stepped section drill bit, for cleaning out an opening previously made, which has become distorted, in cross laminated timbers, (CLT), the bit comprising:
   one or more edges placed axially along the bit and designed to cut wood and one or more flutes designed to force the wood cut by the bit out of the opening;
   the bit having means to be operatively rotated to cut wood, the bit operative to move axially within the opening previously made;
   wherein the proximal-most of the one or more edges of the bit has a first portion, sharpened to cut wood extending into the opening previously made in the CLT, when the bit is placed into the opening previously made in the CLT and operatively rotated;
   the bit having at least one unsharpened edge on at least one of the multi-stepped sections to stop the axial movement of the bit when the bit is rotated and moved axially within an opening and the unsharpened edge rotates and eventually strikes the wood; and,
   wherein the bit comprised between 2 and 3 stepped portions.

6. The drill bit of claim 5, having 3 stepped portions, wherein the edges of the bit are sharp in only the first and second most proximal stepped portions.

7. A multi-step drill bit, for cleaning out a multi-step opening comprising cyclindrical openings of different sized diameters, a large diameter cylinder forming a shoulder adjacent a smaller diameter cylinder, comprising generally concentric portions along an axis, previously made in a cross laminated timber, (CLT) and then distorted, the drill bit comprising:
   two or more stepped sections of cutting faces;
   each of the two or more stepped section comprising a blade, integral to the bit, located axially along the bit at the proximal most step of the bit, designed to cut material and one or more flutes to force the material cut by the bit out of the opening;
   the two or more stepped sections being generally conically shaped so that the stepped section of the cutting faces are larger towards the proximal end of the bit and narrower towards the distal end of the bit;
   each cutting face being sharpened at the outer or exterior part of the bit and remain unsharpened at the inner or interior part of the bit;
   wherein the cuts out the distorted part of the previously made multi-step opening of the interior walls of the drillings in the CLT until the bit is caused to stop when the unsharpened inner part of the bit strikes the shoulder of the first step and stops the rotation of the bit.

8. The drill bit of claim 7, wherein the sharpened first portion of the cutting faces comprises 50% of each cutting face.

9. The drill bit of claim 7, wherein the sharpened first portion of the cutting face comprises between 20% and 50% of the cutting face.

10. The drill bit of claim 7, wherein the bit comprises between 2 and 3 stepped portions.

11. The drill bit of claim 10 wherein the cutting faces of the bit are sharp in only the first and second most proximal stepped portions.

12. The drill bit of claim 7, wherein the bit comprises between 2 and 4 stepped portions.

13. The drill bit of claim 7 having any number of stepped potions.

14. The drill bit of claim 7 wherein the sharpened portions of the cutting faces extend only to a depth equal to those sections of the opening having distortions.

15. The drill bit of claim 7, wherein the barrier for stopping the blade is a shoulder of stepped portion of the opening to be cleaned.

\* \* \* \* \*